(12) United States Patent
Huang

(10) Patent No.: US 9,715,122 B2
(45) Date of Patent: Jul. 25, 2017

(54) LIQUID CRYSTAL DISPLAY SYSTEM AND POLARIZED GLASSES

(71) Applicant: SHENZHEN CHINA STAR OPTOELECTRONICS TECHNOLOGY CO., LTD., Shenzhen, Guangdong (CN)

(72) Inventor: Shishuai Huang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 186 days.

(21) Appl. No.: 14/417,543

(22) PCT Filed: Nov. 21, 2014

(86) PCT No.: PCT/CN2014/091818
§ 371 (c)(1),
(2) Date: Jan. 26, 2015

(87) PCT Pub. No.: WO2016/078064
PCT Pub. Date: May 26, 2016

(65) Prior Publication Data
US 2016/0139423 A1    May 19, 2016

(30) Foreign Application Priority Data
Nov. 19, 2014    (CN) .......................... 2014 1 0663072

(51) Int. Cl.
A61B 3/00        (2006.01)
G02B 27/26       (2006.01)
(Continued)

(52) U.S. Cl.
CPC ............... *G02B 27/26* (2013.01); *G02C 1/00* (2013.01); *G02F 1/133528* (2013.01); *G02F 2001/133531* (2013.01)

(58) Field of Classification Search
CPC ..... G02B 27/26; G02C 1/00; G02F 1/133528; G02F 2001/133531
See application file for complete search history.

(56) References Cited

FOREIGN PATENT DOCUMENTS

| CN | 2615697 Y | 5/2004 |
| CN | 201926835 U | 8/2011 |

(Continued)

OTHER PUBLICATIONS

Dink (Chinese Patent Application Publication CN103838028A, Jun. 2014, machine translation).*

*Primary Examiner* — Tracie Y Green
(74) *Attorney, Agent, or Firm* — Muncy, Geissler, Olds & Lowe, P.C.

(57) ABSTRACT

A liquid crystal display system is provided. The liquid crystal display system includes a backlight module, an LCD panel, and polarized glasses. The LCD panel includes a first polarizer, a liquid crystal layer, an array substrate, and a color film substrate. The polarized glasses include a second polarizer. The direction of the polarized light axis of the second polarizer is perpendicular to the direction of the polarized light axis of the first polarizer when the polarized glasses are used for displaying the display picture of the LCD panel. A private display can be performed for specific users by the present invention.

9 Claims, 2 Drawing Sheets

(51) Int. Cl.
    *G02F 1/1335*     (2006.01)
    *G02C 1/00*     (2006.01)

(56) References Cited

FOREIGN PATENT DOCUMENTS

| | | |
|---|---|---|
| CN | 103091893 A | 5/2013 |
| CN | 103838028 A | 6/2014 |
| JP | H05173126 A | 7/1993 |
| KR | 1020110007287 A | 1/2011 |

\* cited by examiner

LIQUID CRYSTAL DISPLAY SYSTEM AND POLARIZED GLASSES

BACKGROUND OF THE INVENTION

1. Field of the Invention

The present invention relates to a field of liquid crystal display (LCD) technology, and more particularly to a liquid crystal display system and polarized glasses.

2. Description of the Prior Art

LCD devices have been widely used in various fields since they have the advantages of being lightweight and having low energy dissipation. Due to increasing living standards, people's requirements for LCD devices are more and more varied, e.g., 3D displays, curved displays, and the like.

However, an existing LCD device is usually used for public display. That is, users in front of the LCD device are capable of watching content displayed on the LCD device. Or the LCD device can simultaneously provide different display pictures to different users by way of multi-area display. At this point, a private display performed for specific users in front of the LCD device cannot be achieved, meaning a picture is not displayed for other users, or other content is displayed for other users.

Therefore, there is a need to provide an LCD system and polarized glasses, so as to overcome the disadvantage in the prior art.

SUMMARY OF THE INVENTION

An object of the present invention is to provide an LCD system and the corresponding polarized glasses which are capable of performing a private display for specific users, thereby solving a technical problem in which the private display performed for specific users in front of an LCD device cannot be achieved by an existing LCD system.

To overcome the above-mentioned disadvantages, the technical schemes provided by the present invention are hereunder illustrated.

The embodiment of the present invention provides an LCD system. The LCD system includes a backlight module, an LCD panel, and polarized glasses. The LCD panel includes:
a first polarizer for converting the emitting light of the backlight module into a linearly polarized light;
a liquid crystal layer for optically rotating the linearly polarized light emitted by the first polarizer;
an array substrate for controlling the deflection angle of liquid crystal molecules in the liquid crystal layer so as to control the optical rotation angle of the linearly polarized light; and
a color film substrate for converting the linearly polarized light into a linearly polarized light having display colors. The polarized glasses include:
a second polarizer for converting the emitting light of the LCD panel into a display light; and
a controller for controlling the direction of the polarized light axis of the second polarizer. The direction of the polarized light axis of the second polarizer is perpendicular to the direction of the polarized light axis of the first polarizer when the display picture of the LCD panel is displayed on the polarized glasses, and the emitting light produced by the backlight module is a non-polarized light.

In the LCD system of the present invention, the direction of the polarized light axis of the second polarizer controlled by the controller is perpendicular to the direction of the polarized light axis of the first polarizer when the display picture of the LCD panel is displayed on the polarized glasses.

In the LCD system of the present invention, the direction of the polarized light axis of the second polarizer controlled by the controller is parallel to the direction of the polarized light axis of the first polarizer when the display picture of the LCD panel is not displayed on the polarized glasses.

In the LCD system of the present invention, the polarized glasses further include a third polarizer. The direction of the polarized light axis of the third polarizer is parallel to the direction of the polarized light axis of the second polarizer when the display picture of the LCD panel is displayed on the polarized glasses.

In the LCD system of the present invention, the direction of the polarized light axis of the third polarizer is perpendicular to the direction of the polarized light axis of the second polarizer when the display picture of the LCD panel is not displayed on the polarized glasses.

In the LCD system of the present invention, the controller is also used for controlling the direction of the polarized light axis of the third polarizer.

The embodiment of the present invention further provides an LCD device. The LCD device includes a backlight module, an LCD panel, and polarized glasses. The LCD panel includes:
a first polarizer for converting the emitting light of the backlight module into a linearly polarized light;
a liquid crystal layer for optically rotating the linearly polarized light emitted by the first polarizer;
an array substrate for controlling the deflection angle of liquid crystal molecules in the liquid crystal layer so as to control the optical rotation angle of the linearly polarized light; and
a color film substrate for converting the linearly polarized light into a linearly polarized light having display colors. The polarized glasses include a second polarizer for converting the emitting light of the LCD panel into a display light. The direction of the polarized light axis of the second polarizer is perpendicular to the direction of the polarized light axis of the first polarizer when the polarized glasses are used for displaying the display picture of the LCD panel.

In the LCD system of the present invention, the polarized glasses further include a controller for controlling the direction of the polarized light axis of the second polarizer.

In the LCD system of the present invention, the direction of the polarized light axis of the second polarizer controlled by the controller is perpendicular to the direction of the polarized light axis of the first polarizer when the display picture of the LCD panel is displayed on the polarized glasses.

In the LCD system of the present invention, the direction of the polarized light axis of the second polarizer controlled by the controller is parallel to the direction of the polarized light axis of the first polarizer when the display picture of the LCD panel is not displayed on the polarized glasses.

In the LCD system of the present invention, the polarized glasses further include a third polarizer. The direction of the polarized light axis of the third polarizer is parallel to the direction of the polarized light axis of the second polarizer when the display picture of the LCD panel is displayed on the polarized glasses.

In the LCD system of the present invention, the direction of the polarized light axis of the third polarizer is perpendicular to the direction of the polarized light axis of the second polarizer when the display picture of the LCD panel is not displayed on the polarized glasses.

In the LCD system of the present invention, the polarized glasses further include a controller for controlling the direction of the polarized light axis of the third polarizer.

The embodiment of the present invention further provides polarized glasses used in an LCD system. The LCD system further includes a backlight module and an LCD panel. The LCD panel includes a first polarizer for converting the emitting light of the backlight module into a linearly polarized light. The polarized glasses include a second polarizer for converting the emitting light of the LCD panel into a display light. The direction of the polarized light axis of the second polarizer is perpendicular to the direction of the polarized light axis of the first polarizer when the polarized glasses are used for displaying the display picture of the LCD panel.

In the polarized glasses of the present invention, the polarized glasses further include a controller for controlling the direction of the polarized light axis of the second polarizer.

In the polarized glasses of the present invention, the direction of the polarized light axis of the second polarizer controlled by the controller is perpendicular to the direction of the polarized light axis of the first polarizer when the display picture of the LCD panel is displayed on the polarized glasses.

In the polarized glasses of the present invention, the direction of the polarized light axis of the second polarizer controlled by the controller is parallel to the direction of the polarized light axis of the first polarizer when the display picture of the LCD panel is not displayed on the polarized glasses.

In the polarized glasses of the present invention, the polarized glasses further include a third polarizer. The direction of the polarized light axis of the third polarizer is parallel to the direction of the polarized light axis of the second polarizer when the display picture of the LCD panel is displayed on the polarized glasses.

In the polarized glasses of the present invention, the direction of the polarized light axis of the third polarizer is perpendicular to the direction of the polarized light axis of the second polarizer when the display picture of the LCD panel is not displayed on the polarized glasses.

In the polarized glasses of the present invention, the polarized glasses further include a controller for controlling the direction of the polarized light axis of the third polarizer.

In comparison to the existing LCD system, a private display performed for specific users who wear the polarized glasses is achieved by disposing the second polarizer onto the polarized glasses in the LCD system of the present invention, thereby solving the technical problem in which a private display performed for specific users in front of the LCD device cannot be achieved by the existing LCD system.

The above objectives, and other objectives, features, advantages, and embodiments of the present invention will be better understood from the following description being considered in connection with the accompanied drawings, and in which two preferred embodiments of the invention are illustrated by way of example.

DETAILED DESCRIPTION OF THE PREFERRED EMBODIMENTS

Figure 1:
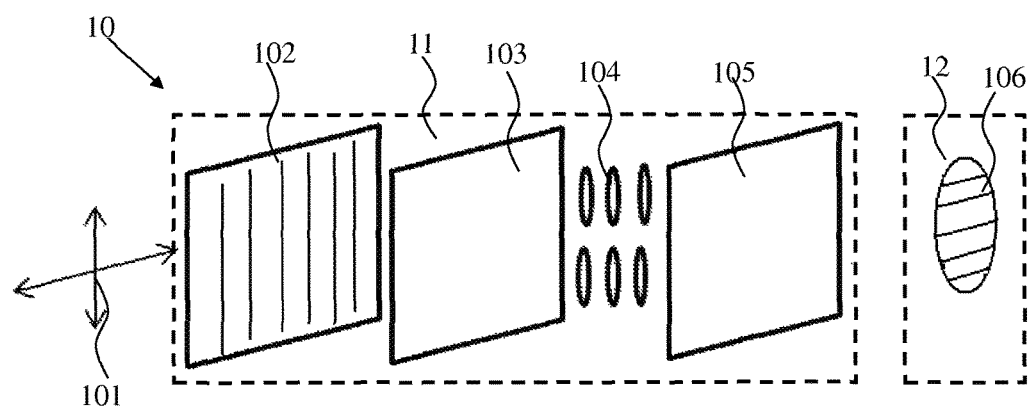
FIG. 1 is a schematic view of a structure of an LCD system according to a first preferred embodiment of the present invention.

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", "left", "right", "inside", "outside", "side", etc., is used with reference to the orientation of the figure(s) being described. As such, the directional terminology is used for purposes of illustration and is in no way limiting.

Throughout this specification and in the drawings like parts will be referred to by the same reference numerals.

Please refer to FIG. 1, which is a schematic view of a structure of an LCD system according to a first preferred embodiment of the present invention. The LCD system 10 of the preferred embodiment includes a backlight module (not shown in the figure), an LCD panel 11, and polarized glasses 12.

The LCD panel 11 includes a first polarizer 102, a liquid crystal layer 104, an array substrate 103, and a color film substrate 105. The first polarizer 102 is used for converting the emitting light 101 of the backlight module into a linearly polarized light. The liquid crystal layer 104 is used for optically rotating the linearly polarized light emitted by the first polarizer 102. The array substrate 103 is used for controlling the deflection angle of liquid crystal molecules in the liquid crystal layer 140, thereby the optical rotation angle of the linearly polarized light is controlled. The color film substrate 105 is used for converting the linearly polarized light into a linearly polarized light having display colors.

The polarized glasses 12 include a second polarizer 106. The second polarizer 106 is used for converting the emitting light of the LCD panel 11 into a display light. The direction of the polarized light axis of the second polarizer 106 is perpendicular to the direction of the polarized light axis of the first polarizer 102 when the display picture of the LCD panel 11 is displayed on the polarized glasses 12.

When the LCD system 10 of the preferred embodiment is used, the backlight module produces the emitting light 101, and the emitting light 101 is a non-polarized light. The emitting light 101 is converted into the linearly polarized light after the emitting light 101 irradiates through the first polarizer 102 of the LCD panel 11, the polarization direction of the linearly polarized light is the same as the direction of the polarized light axis of the first polarizer 102. Then, the linearly polarized light is optically rotated by the liquid crystal layer 104 of the LCD panel 11, a specific optical rotation angle is determined according to the deflection angle of the liquid crystal molecules in the liquid crystal layer 104 (the liquid crystal molecules are drove by pixel electrodes on the array substrate 103), thereby the display contents of the LCD panel 11 can be represented by linearly polarized lights of various optical rotation angles. Finally, the linearly polarized light is converted into the linearly polarized light having display colors by color film photoresists and black matrices on the color film substrate 105. At this point, the LCD panel 11 displays a cloud of white color blocks in accordance with the linearly polarized light since stray lights in the linearly polarized light are not filtered. Picture contents cannot really be displayed on the LCD panel 11.

However, the polarized glasses 12 have the second polarizer 106 thereon. The second polarizer 106 is used for converting the emitting light of the LCD panel 11 into the display light. The linearly polarized light emitted by the LCD panel 11 can be filtered by the second polarizer 106 since the direction of the polarized light axis of the second polarizer 106 is perpendicular to the direction of the polarized light axis of the first polarizer 102, thereby the linearly polarized light for displaying a real picture content remains.

Therefore, users in front of the LCD system 10 cannot watch the display contents of the LCD system, while the users can watch the real picture content of the LCD system 10 only by wearing the polarized glasses 12. Thus, a private display of specific users in front of the LCD system 10 is achieved.

In the LCD system of the preferred embodiment, a private display performed for specific users who wear the polarized glasses is achieved by disposing the second polarizer onto the polarized glasses.

Figure 2:
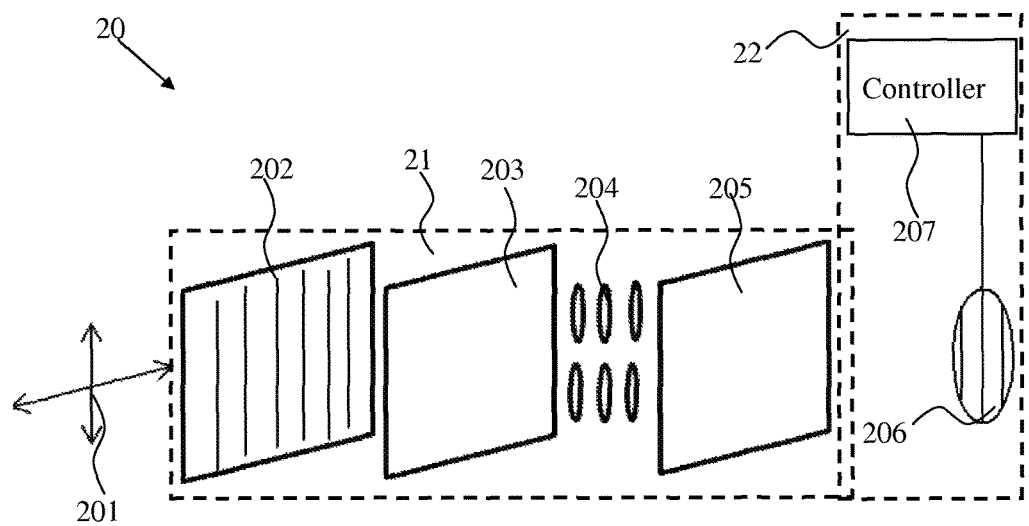
FIG. 2 is a schematic view of a structure of an LCD system according to a second preferred embodiment of the present invention.

Please refer to FIG. 2, which is a schematic view of a structure of an LCD system according to a second preferred embodiment of the present invention. The LCD system 20 of the preferred embodiment includes a backlight module (not shown in the figure), an LCD panel 21, and polarized glasses 22.

The LCD panel 21 includes a first polarizer 202, a liquid crystal layer 204, an array substrate 203, and a color film substrate 205. The first polarizer 202 is used for converting the emitting light 201 of the backlight module into a linearly polarized light. The liquid crystal layer 204 is used for optically rotating the linearly polarized light emitted by the first polarizer 202. The array substrate 203 is used for controlling the deflection angle of liquid crystal molecules in the liquid crystal layer 204, thereby the angle optical rotation of the linearly polarized light is controlled. The color film substrate 205 is used for converting the linearly polarized light into a linearly polarized light having display colors. The polarized glasses 22 include a second polarizer 206. The second polarizer 206 is used for converting the emitting light of the LCD panel 21 into a display light.

On the basis of the first preferred embodiment of the LCD system, the polarized glasses 22 in the LCD system 20 of the preferred embodiment further include a controller 207. The controller 207 is used for controlling the direction of the polarized light axis of the second polarizer 206. The direction of the polarized light axis of the second polarizer 206 controlled by the controller 207 is perpendicular to the direction of the polarized light axis of the first polarizer 202 when the display picture of the LCD panel 21 is displayed on the polarized glasses 22, thereby a real picture content can be confidentially displayed on the polarized glasses 22, as shown in FIG. 1. The direction of the polarized light axis of the second polarizer 206 controlled by the controller 207 is parallel to the direction of the polarized light axis of the first polarizer 202 when the display picture of the LCD panel 21 is not displayed on the polarized glasses 22, thereby the real picture content cannot be displayed on the polarized glasses 22, as shown in FIG. 2.

In the LCD system of the preferred embodiment, the polarized glasses can be turned on or off by disposing the controller, thereby the private display effect of the LCD system is enhanced.

Figure 3:
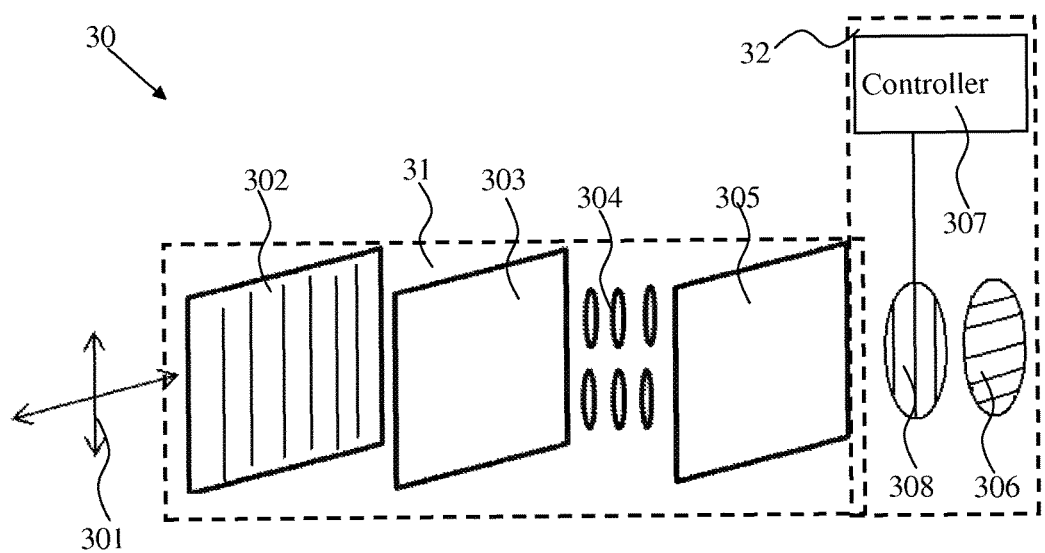
FIG. 3 is a first schematic view of a structure of an LCD system according to a third preferred embodiment of the present invention.
Figure 4:
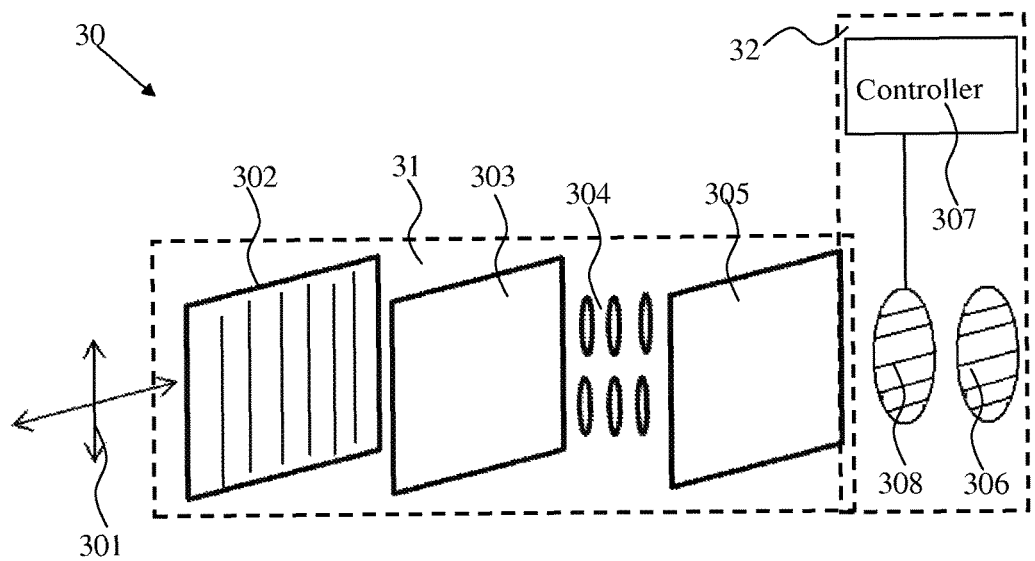
FIG. 4 is a second schematic view of a structure of the LCD system according to the third preferred embodiment of the present invention.

Please refer to FIG. 3 and FIG. 4. FIG. 3 is a first schematic view of a structure of an LCD system according to a third preferred embodiment of the present invention. FIG. 4 is a second schematic view of a structure of the LCD system according to the third preferred embodiment of the present invention. The LCD system 30 of the preferred embodiment includes a backlight module (not shown in the figure), an LCD panel 31, and polarized glasses 32.

The LCD panel 31 includes a first polarizer 302, a liquid crystal layer 304, an array substrate 303, and a color film substrate 305. The first polarizer 302 is used for converting the emitting light 301 of the backlight module into a linearly polarized light. The liquid crystal layer 304 is used for optically rotating the linearly polarized light emitted by the first polarizer 302. The array substrate 303 is used for controlling the deflection angle of liquid crystal molecules in the liquid crystal layer 304, thereby the optical rotation angle of the linearly polarized light is controlled. The color film substrate 305 is used for converting the linearly polarized light into a linearly polarized light having display colors. The polarized glasses 32 include a second polarizer 30. The second polarizer 306 is used for converting the emitting light of the LCD panel 31 into a display light.

On the basis of the first preferred embodiment of the LCD system, the polarized glasses 32 in the LCD system 30 of the preferred embodiment further include a controller 307 and a third polarizer 308. The controller is used for controlling the direction of the polarized light axis of the third polarizer 308. The direction of the polarized light axis of the third polarizer 308 is parallel to the direction of the polarized light axis of the second polarizer 306 when the display picture of the LCD panel 31 is displayed on the polarized glasses 32. The direction of the polarized light axis of the third polarizer 308 is perpendicular to the direction of the polarized light axis of the second polarizer 306 when the display picture of the LCD panel 31 is not displayed on the polarized glasses 32.

When the LCD system 30 of the preferred embodiment is used, the direction of the polarized light axis of the third polarizer 308 controlled by the controller 307 is parallel to the direction of the polarized light axis of the second polarizer 306 when the display picture of the LCD panel 31 is displayed on the polarized glasses 32. At this point, the direction of the polarized light axis of the second polarizer 306 is perpendicular to the direction of the polarized light axis of the first polarizer 302, thereby a real picture content can be confidentially displayed on the polarized glasses 32, as shown in FIG. 4. The direction of the polarized light axis of the third polarizer 308 controlled by the controller 307 is perpendicular to the direction of the polarized light axis of the second polarizer 306 when the display picture of the LCD panel 31 is not displayed on the polarized glasses 32. At this point, the polarized glasses 32 are totally opaque, thereby the real picture content cannot be displayed on the polarized glasses 32, as shown in FIG. 3.

In the LCD system of the preferred embodiment, the polarized glasses can be turned on or off by disposing the controller and the third polarizer, thereby the private display effect of the LCD system is enhanced.

In the LCD system of the present invention, a private display performed for specific users who wear the polarized glasses is achieved by disposing the second polarizer onto the polarized glasses, thereby solving a technical problem in which a private display performed for specific users in front of an LCD device cannot be achieved by an existing LCD system.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display system, comprising a backlight module, an LCD panel, and polarized glasses, the LCD panel comprising:
   a first polarizer for converting an emitting light of the backlight module into a linearly polarized light;
   a liquid crystal layer for optically rotating the linearly polarized light emitted by the first polarizer;
   an array substrate for controlling a deflection angle of liquid crystal molecules in the liquid crystal layer so as to control an optical rotation angle of the linearly polarized light; and
   a color film substrate for converting the linearly polarized light into a linearly polarized light having display colors,
   the polarized glasses comprising:
   a second polarizer for converting an emitting light of the LCD panel into a display light;
   a third polarizer; and
   a controller for controlling a direction of a polarized light axis of the third polarizer,
   wherein a direction of a polarized light axis of the second polarizer is perpendicular to a direction of a polarized light axis of the first polarizer, the emitting light produced by the backlight module is a non-polarized light.

2. The liquid crystal display system of claim 1, wherein the direction of the polarized light axis of the third polarizer is parallel to the direction of the polarized light axis of the second polarizer when the display picture of the LCD panel is displayed on the polarized glasses.

3. The liquid crystal display system of claim 2, wherein the direction of the polarized light axis of the third polarizer is perpendicular to the direction of the polarized light axis of the second polarizer when the display picture of the LCD panel is not displayed on the polarized glasses.

4. A liquid crystal display system, comprising a backlight module, an LCD panel, and polarized glasses, the LCD panel comprising:
   a first polarizer for converting an emitting light of the backlight module into a linearly polarized light;
   a liquid crystal layer for optically rotating the linearly polarized light emitted by the first polarizer;
   an array substrate for controlling a deflection angle of liquid crystal molecules in the liquid crystal layer so as to control an optical rotation angle of the linearly polarized light; and
   a color film substrate for converting the linearly polarized light into a linearly polarized light having display colors,
   the polarized glasses comprising:
   a second polarizer for converting an emitting light of the LCD panel into a display light;
   a third polarizer; and
   a controller for controlling a direction of a polarized light axis of the third polarizer,
   wherein a direction of a polarized light axis of the second polarizer is perpendicular to a direction of a polarized light axis of the first polarizer.

5. The liquid crystal display system of claim 4, wherein the direction of the polarized light axis of the third polarizer is parallel to the direction of the polarized light axis of the second polarizer when the display picture of the LCD panel is displayed on the polarized glasses.

6. The liquid crystal display system of claim 5, wherein the direction of the polarized light axis of the third polarizer is perpendicular to the direction of the polarized light axis of the second polarizer when the display picture of the LCD panel is not displayed on the polarized glasses.

7. Polarized glasses, for using in a liquid crystal display system, the liquid crystal display system further comprising a backlight module and an LCD panel, the LCD panel comprising a first polarizer for converting an emitting light of the backlight module into a linearly polarized light, wherein the polarized glasses comprise:
   a second polarizer for converting an emitting light of the LCD panel into a display light;
   a third polarizer; and
   a controller for controlling a direction of a polarized light axis of the third polarizer,
   wherein a direction of a polarized light axis of the second polarizer is perpendicular to a direction of a polarized light axis of the first polarizer.

8. The polarized glasses of claim 7, wherein the direction of the polarized light axis of the third polarizer is parallel to the direction of the polarized light axis of the second polarizer when the display picture of the LCD panel is displayed on the polarized glasses.

9. The polarized glasses of claim 8, wherein the direction of the polarized light axis of the third polarizer is perpendicular to the direction of the polarized light axis of the second polarizer when the display picture of the LCD panel is not displayed on the polarized glasses.

* * * * *